United States Patent [19]

Spall

[11] 4,235,093
[45] Nov. 25, 1980

[54] LOW FRICTION BEARING STARTING TORQUE APPARATUS

[75] Inventor: James M. Spall, Plymouth, Mich.

[73] Assignee: Burroughs Corporation, Detroit, Mich.

[21] Appl. No.: 46,946

[22] Filed: Jun. 8, 1979

[51] Int. Cl.³ .................................... G01M 13/04
[52] U.S. Cl. .................................................... 73/9
[58] Field of Search ............................................ 73/9

[56] References Cited

U.S. PATENT DOCUMENTS

| 2,398,156 | 4/1946 | Puterbaugh et al. ................. 73/9 |
| 2,887,875 | 5/1959 | Curriston ............................. 73/9 |
| 3,521,198 | 1/1971 | Friedland ............................. 73/9 |

Primary Examiner—S. Clement Swisher
Attorney, Agent, or Firm—Charles P. Sammut; Charles E. Quarton; Kevin R. Peterson

[57] ABSTRACT

A low friction bearing starting torque apparatus applies a known acceleration to a stationary bearing having a known radial load, to measure the starting torque of the bearing.

5 Claims, 5 Drawing Figures

U.S. Patent  Nov. 25, 1980  Sheet 1 of 2  4,235,093
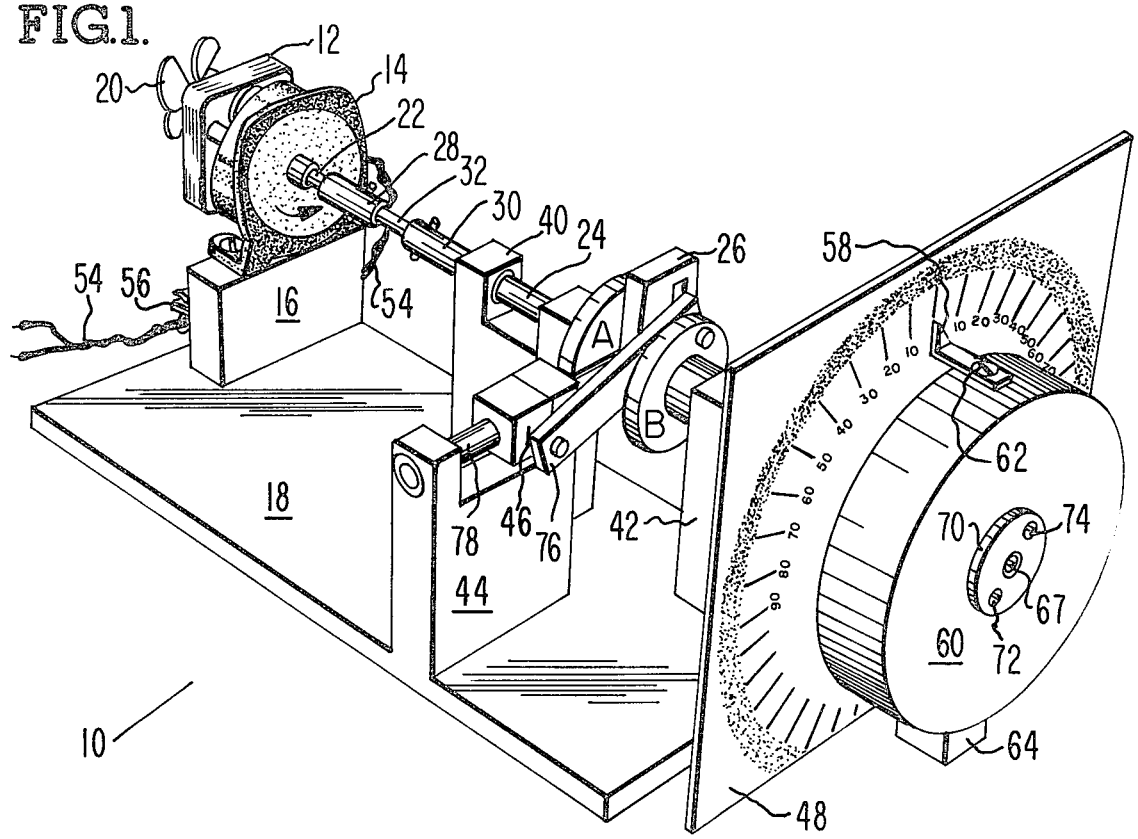
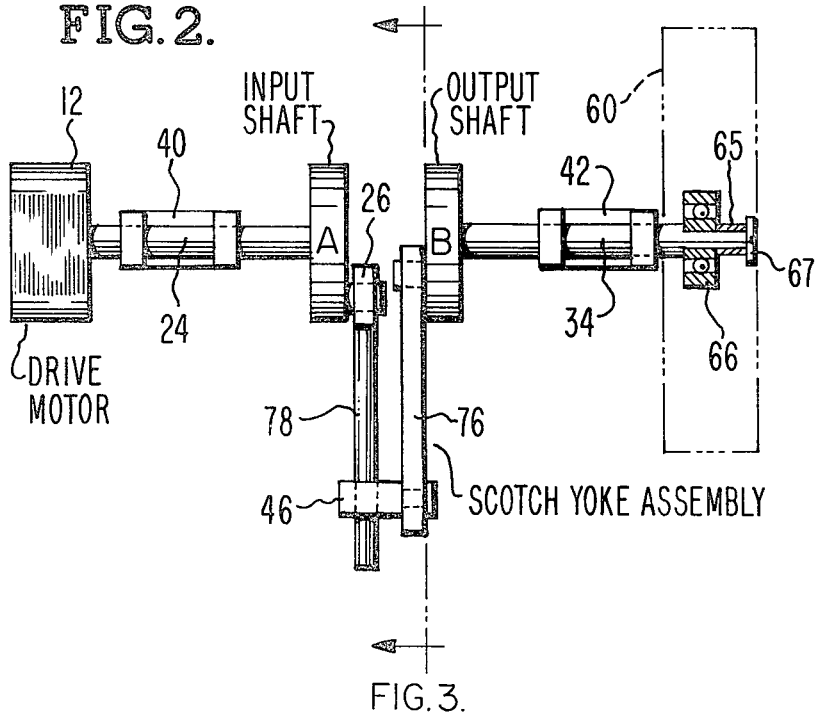
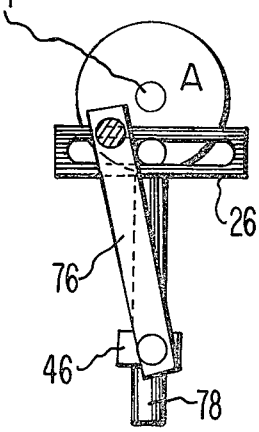

LOW FRICTION BEARING STARTING TORQUE APPARATUS

CROSS-REFERENCE TO RELATED APPLICATIONS

This application is related to the application entitled "LOW FRICTION BEARING RUNNING TORQUE MEASURING APPARATUS" filed by James Michael Spall on June 8, 1979, Ser. No. 046,945.

BACKGROUND OF THE INVENTION

1. Field of the Invention

This invention relates to an apparatus for measuring the starting torque of a bearing and more particularly to an apparatus which applies a known radial load and a known acceleration to a bearing to permit measurement of the starting torque of the bearing.

2. Description of the Prior Art

Low friction bearings are utilized in a variety of applications driven by electric motors. Because certain types of electric motors exhibit very low starting torque, bearing starting torque is of interest. In order to provide an accurate measurement of the starting torque of a to a bearing, a measuring apparatus must have the following characteristics:
1. Be sufficiently sensitive to measure the torque of a low friction bearing,
2. Exert a sufficient radial load on the test bearing, and
3. Not exert an inertial load which would give an erroneous indication.

Bearing manufacturers presently measure low friction bearing starting torque with the bearing under an axial load. While this type of test allows the use of a much simpler test apparatus, an axial load does not always provide a good simulation of an actual operating load. Thus, the torque values obtained in such a test could be misleading. Accordingly, it is desirable to provide a test apparatus that will closely simulate radial operating loads upon a test bearing.

SUMMARY OF THE INVENTION

It is an object of the invention to provide an apparatus for measuring the starting torque of a test bearing under a known acceleration while the bearing is under a known radial load. It is also an object of the invention to provide a test apparatus that measures the starting torque of the test bearing without having to account for any torque of the test apparatus. A further object of the invention is to provide a test apparatus where inertial effect can be easily controlled. Another object of the invention is to provide a test apparatus that is extremely simple and inexpensive when compared to currently available bearing testers. The preferred embodiment of the invention consists of two sections. The first section applies a radial load to the outer race of the test bearing and also provides a means for measuring the starting torque of the bearing. The second section provides a means for driving the test bearing and for controlling the acceleration of that drive.

BRIEF DESCRIPTION OF THE DRAWING

FIG. 1 is a front three-quarter view of a preferred embodiment of the invention.

FIG. 2 is a detailed side view of the drive motor, input shaft, scotch yoke assembly and output shaft of FIGS. 1 and 2.

FIG. 3 is a front view of the scotch yoke assembly and the input and output shafts of FIGS. 1 and 2.

DESCRIPTION OF THE PREFERRED EMBODIMENT

Figure 4:
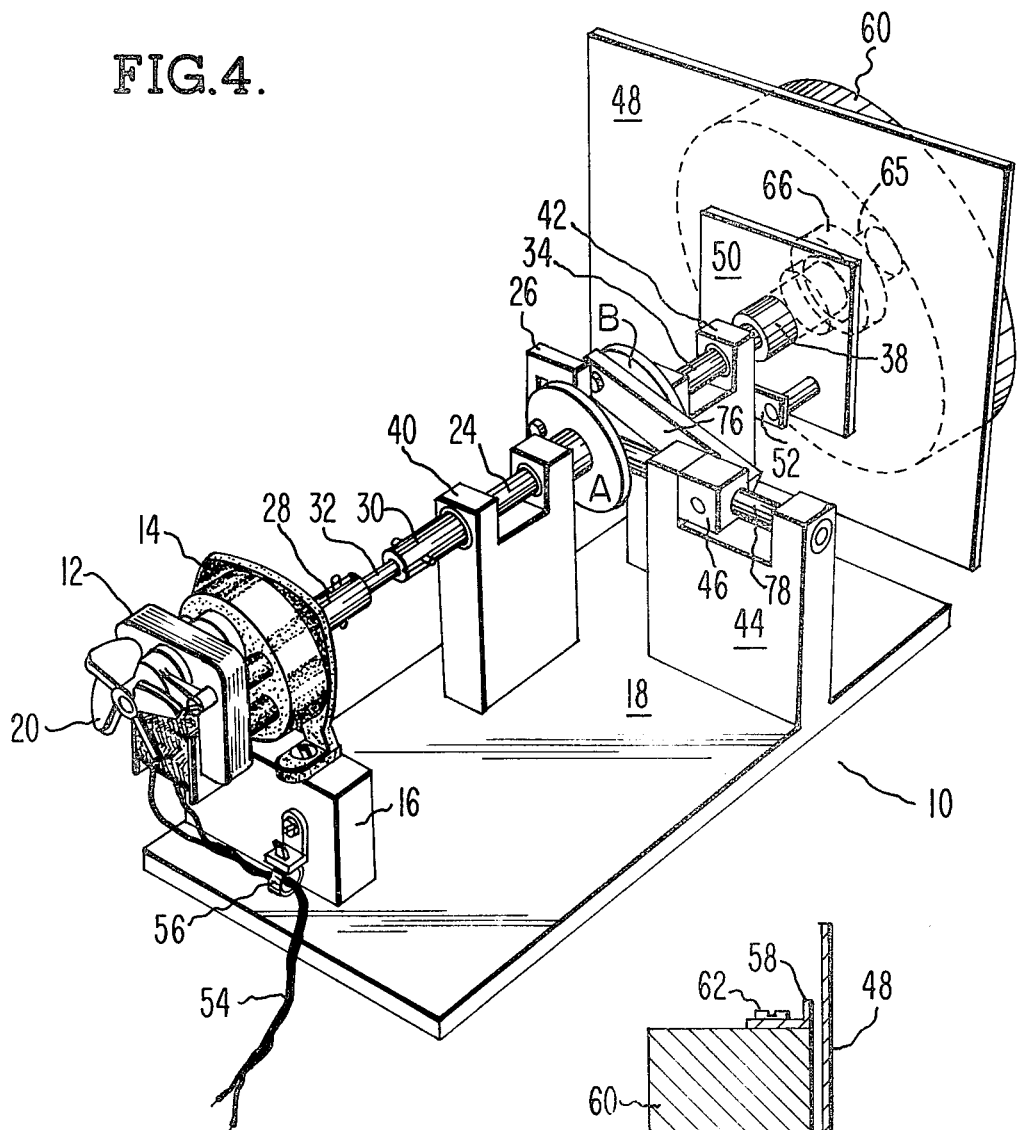
FIG. 4 is a rear three-quarter view of a preferred embodiment of the invention.
Figure 5:
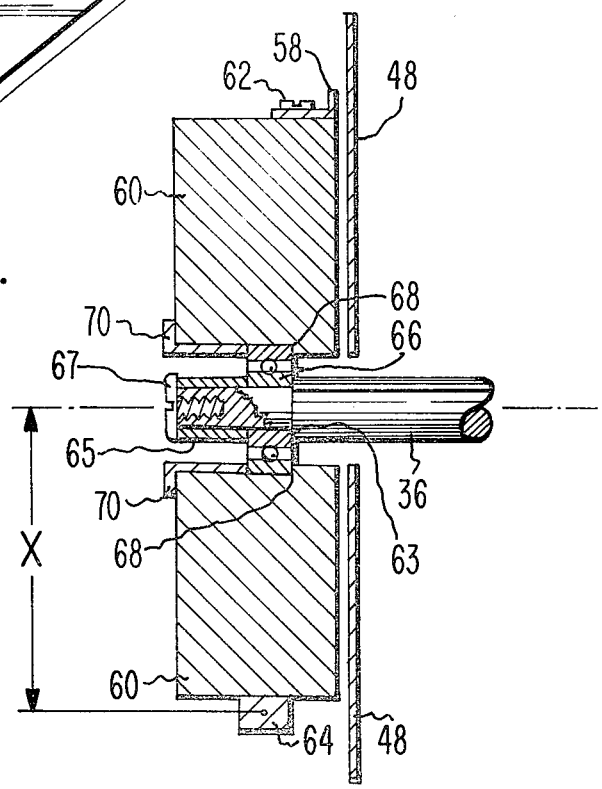
FIG. 5 is a detailed side view of the radial load weight, pendulum weight and protractor panel of FIGS. 1 and 2.

Referring to the figures the preferred embodiment of the invention is shown generally at 10. A drive motor 12 is secured to a reduction gear mechanism 14. The reduction gear mechanism 14 is secured to a spacer block 16. The spacer block 16 is mounted onto a base plate 18. A fan blade 20 is driven by the motor 12 in order to cool the motor 12.

A motor output shaft 22 of the reduction gear mechanism 14 is coupled to an input shaft 24 of a scotch yoke assembly 26 through a pair of couples 28 and 30 and a coupling shaft 32. An output shaft 34 of the scotch yoke assembly 26 is coupled to a bearing drive shaft 36 through a coupler 38.

A pair of supports 40 and 42 secure the input shaft 24 and the output shaft 34 respectively. A side support 44 provides a pivot point 46 for the scotch yoke assembly 26. A protractor plate 48 is secured to the support 42 through a spacer plate 50 and a support bridge 52.

A line cord 54 is secured to the spacer block 16 by a clip 56. The line cord 54 supplies power to the motor 12. A pointer 58 is attached to a radial load weight 60 by a screw 62. A pendulum weight 64 is mounted onto the radial load weight 60, 180° away from the pointer 58.

The inner race of a test bearing 66 is mounted onto the bearing drive shaft 36 against a shoulder 63. The shoulder 63 is formed by the junction of two sections of the bearing drive shaft 36, each of which has a different diameter. The smaller diameter of the bearing drive shaft 36 is just slightly under the inner diameter of the inner race of the test bearing 66. The inner race of the test bearing 66 is held against the shoulders 63 by a retaining sleeve 65. The retaining sleeve 65 is secured by a screw 67 which attaches to the bearing drive shaft 36.

The outer race of the test bearing 66 is positioned within the radial load weight 60 between a shoulder 68 and of a sleeve 70. The sleeve 70 is secured to the radial load weight 60 by a pair of screws 72 and 74. The scotch yoke assembly 26 consists of a cycloid arm 76 and a pivot arm 78.

In operation the motor output shaft 22 provides input power to the input shaft 24 through the couplers 28 and 30 and the coupling shaft 32. The input shaft 24 drives the scotch yoke assembly 26. The scotch yoke assembly 26 converts the constant-speed rotary motion of the input shaft 24 to sinusoidal linear motion at the pivot arm 78. The pivot arm 78 then drives the output shaft 34 in approximately sinusoidal rotation through the cycloid arm 76. The output shaft 34 drives the inner race of the bearing 66 through the bearing drive shaft 36 and the coupler 38.

In order to fully explain the invention it is helpful to examine the problems that arise if a test bearing is accelerated from a stationary state to a final velocity. Assuming that the velocity of the inner race of the test bearing 66 increases linearly from zero to a final velocity, the acceleration will be in the form of a step function. Consequently, the jerk, that is, the rate of change of acceleration will be an impulse. Thus, the inertial effects of the test bearing 66 and test apparatus 10 will alter the measurement of the starting torque of the test bearing 66.

In order to overcome the problems associated with rotating the inner race of the test bearing 66 with a velocity which has an impulse function as one of its higher order derivatives, the bearing drive shaft 36 is rotated with a sinusoidal rotation. Thus, the displacement, velocity, acceleration and jerk are all forms of sinusoids:

Displacement $= f(x) = \cos(t)$
Velocity $= f'(x) = \sin(t)$
Acceleration $= f''(x) = -\cos(t)$
Jerk $= f'''(x) = \sin(t)$ where x is the rotational velocity of the motor output shaft 22 and t = time.

Thus in a steady state situation, the inertial effects are zero. However, since bearing starting torque is defined as the torque required to produce the first movement in the bearing 66, no steady-state exists. Therefore, the inertia of the test apparatus 10 must be controlled.

From the definition of torque, $$T_i = I\alpha$$

where $T_i$ = torque due to inertia,
I = moment of inertia of the radial load weight 60 and the pendulum weight 64, and
$\alpha$ = angular acceleration of the bearing inner race.

The moment of inertia of the radial load weight 60 and the pendulum weight 64 can either be calculated or measured. The angular acceleration of the bearing inner race is determined by the velocity of the motor 12.

By selecting $T_i$, the torque due to inertia, to be 1% of the anticipated bearing starting torque, the inertia of the apparatus will not significantly affect the accuracy of the bearing starting torque measurement. From the above, it can be shown that $$\alpha = T_i/I = -\omega^2 \cos(\omega t).$$

Since at maximum acceleration $\cos(\omega t) = 1$, $$\alpha = T_i/I = -\omega^2$$

Thus the motor rotational velocity $\omega$ can be selected as:

$$\omega = \sqrt{\frac{T_i}{I}} \text{ radians/second}$$

radians/second and the inertial effects of the test apparatus 10 will be controlled within the desired limits. In the preferred embodiment of the invention, $\omega$ is chosen to be 1 radian/second. However, this rotational velocity may be altered to any desired value consistent with the necessary accuracy.

In operation, when electric power is first supplied to the motor 12 and the motor output shaft 22 begins to rotate, the radial load weight 64 will be deflected to a peak value. This peak value can be determined either visually or with an optical type sensor which is well known in the art. Thus, for a given radial load weight and a given motor rotational velocity, bearing starting torque = $mx \sin \theta$ where m = mass of pendulum weight 64
x = distance from axis of bearing drive shaft to the center of gravity of the pendulum weight 64
and $\theta$ = peak deflection angle of the pendulum weight 64.

The invention has been described with reference to a specific embodiment and it is to be understood that although this embodiment represents the best mode of practicing the invention known to the inventor at the time of filing the patent application, various modifications and additions to the illustrated embodiment are possible and accordingly the foregoing description is not to be construed in a limiting sense.

I claim:

1. An apparatus for applying a radial load to a bearing and measuring the starting torque of the bearing comprising:
   a bearing having an inner race and an outer race;
   radial load means for applying a uniform radial load to the outer race of the bearing;
   sinusoidal drive means for rotating the inner race of the bearing such that the velocity of the inner race is substantially sinusoidal;
   pendulum weight means for exerting a restoring force on the radial load means;
   means for indicating the angular displacement of the radial load means.

2. The apparatus of claim 1 wherein the radial load means further comprises:
   a cylinder having a first bore and a second bore, each bore being concentric with one another the diameter of the first bore being less than the diameter of the second bore, and
   a sleeve extending within the second bore, for securing the bearing against a shoulder formed by the junction of the first bore and the second bore.

3. The apparatus of claim 1 wherein the drive means further comprises:
   an electric motor,
   a driven spindle concentric with and in contact with the inner race of the bearing, for driving the inner race of the bearing,
   a scotch yoke coupled between the electric motor and the driven spindle, for converting the constant speed rotary motion of the motor to sinusoidal rotary motion.

4. The apparatus of claim 1 wherein the indicating means further comprises:
   a pointer secured to a location on the radial load means 180° from the pendulum weight means; and
   scale means for indicating the relative position of the pointer.

5. A method of applying a radial load to a bearing and measuring the starting torque of the bearing, comprising:
   applying a known uniform radial load to an outer race of the bearing;
   rotating an inner race of the bearing at a sinusoidal velocity thereby generating a starting torque on the outer race of the bearing;
   applying a restoring force to the uniform radial load to restrain rotation thereof by the starting torque applied to the outer race of the bearing; and
   indicating the angular displacement of the radial load.

* * * * *